US012421611B2

(12) United States Patent
Tadiello et al.

(10) Patent No.: US 12,421,611 B2
(45) Date of Patent: Sep. 23, 2025

(54) ELECTROLYSIS ARRANGEMENT FOR ALKALINE ELECTROLYSIS

(71) Applicant: L'Air Liquide, Société Anonyme pour l'Etude et l'Exploitation des Procédés Georges Claude, Paris (FR)

(72) Inventors: Jean-Philippe Tadiello, Frankfurt am Main (DE); Nga Thi Quynh Do, Frankfurt am Main (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 780 days.

(21) Appl. No.: 17/716,573

(22) Filed: Apr. 8, 2022

(65) Prior Publication Data

US 2022/0325423 A1    Oct. 13, 2022

(30) Foreign Application Priority Data

Apr. 9, 2021  (EP) .................................... 21020193

(51) Int. Cl.
   *C25B 1/04*      (2021.01)
   *C25B 15/08*     (2006.01)

(52) U.S. Cl.
   CPC .............. *C25B 1/04* (2013.01); *C25B 15/083* (2021.01); *C25B 15/087* (2021.01)

(58) Field of Classification Search
   CPC ........ C25B 1/04; C25B 15/087; C25B 15/083
   See application file for complete search history.

(56) References Cited

U.S. PATENT DOCUMENTS

2021/0262101 A1*  8/2021  Tanaka .................. C25B 15/087

FOREIGN PATENT DOCUMENTS

| CA | 2 435 902 | 8/2002 |
|----|-----------|--------|
| CN | 103 882 466 | 5/2016 |
| EP | 1 243 671 | 9/2002 |
| EP | 3 770 304 | 1/2021 |
| JP | 2016 204698 | 12/2016 |

OTHER PUBLICATIONS

Trinke, P. et al., Hydrogen crossover in PEM and alkaline water electrolysis: mechanisms, direct comparison and mitigation strategies, J. Electrochem. Soc. 165, 2018, F502-F513.
European Search Report and Written Opinion for corresponding EP 21020193, Oct. 4, 2021.

* cited by examiner

*Primary Examiner* — Ciel P Contreras
(74) *Attorney, Agent, or Firm* — Elwood L. Haynes

(57) ABSTRACT

The invention relates to an electrolysis arrangement for the electrochemical production of hydrogen and oxygen from an alkaline electrolyte having anode and cathode separators for the separation of oxygen and hydrogen from the electrolyte, and an anode and cathode pipe system to circulate electrolyte between anode and cathode sections of an electrolysis stack of the electrolysis arrangement. Control valves and interconnections are configured so that dependent on an electrolyte flow rate passing first, second and third control valve, oxygen and hydrogen depleted electrolyte withdrawn from the separators can be supplied unmixed, partly mixed or fully mixed to the anode and cathode sections of the electrolysis stack to control hydrogen to oxygen and oxygen to hydrogen crossover in the electrolysis arrangement.

13 Claims, 3 Drawing Sheets

ELECTROLYSIS ARRANGEMENT FOR ALKALINE ELECTROLYSIS

CROSS REFERENCE TO RELATED APPLICATIONS

This application claims the benefit of priority under 35 U.S.C. § 119 (a) and (b) to European Patent Application No. EP 21020193.5, filed Apr. 9, 2021, the entire contents of which are incorporated herein by reference.

TECHNICAL FIELD

The invention relates to an electrolysis arrangement for the electrochemical production of hydrogen and oxygen from an alkaline electrolysis medium.

BACKGROUND ART

In alkaline electrolysis of water, a highly concentrated lye solution is used as an electrolyte medium. In particular, aqueous potassium hydroxide with a concentration of 1 mol/l (1 M) up to 6 mol/l (6 M) is used as electrolyte.

In alkaline electrolysis, the following half reactions occur at the anode and cathode sections of the electrolysis stack:

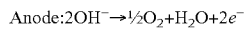
Anode: $2OH^- \rightarrow \frac{1}{2}O_2 + H_2O + 2e^-$

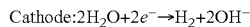
Cathode: $2H_2O + 2e^- \rightarrow H_2 + 2OH^-$

This results in the following sum of the two half reactions.

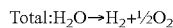
Total: $H_2O \rightarrow H_2 + \frac{1}{2}O_2$

Hence, one mole of water is produced at the anode and 2 moles of water are consumed at the cathode per mole of produced hydrogen. So due to the constantly proceeding electrochemical reaction of water splitting, the concentration of the lye in the anode and the cathode sections of the electrolysis arrangement will change over time. In the anode section the lye concentration decreases due to generation of water, and in the cathode section the lye concentration increases due to the consumption of water. This imbalance is further triggered by the electro-osmotic drag of hydroxyl ions, as each hydroxyl ion is able to take up to 2 water molecules.

Hence, in known electrolysers, mixing of the lye withdrawn from the anode and cathode section of the stack is done after separation of the hydrogen and oxygen product gases to balance the lye concentration of the cycle streams. After mixing, the stream with balanced lye concentration is split and the separated streams are fed to the anode and cathode section of the stack respectively for further water splitting. If the concentrations of the lye streams are not balanced, the concentrations would continue to diverge, which causes efficiency losses on the electrolyser performance. This becomes apparent from the dependence of electrical conductivity of the lye on the lye concentration. There is a distinct maximum in the conductivity corresponding to an optimal lye concentration from the point of view of ohmic losses of the electrolyser. For example, when performing electrolysis at 85° C., a concentrated aqueous KOH solution has the highest specific electrical conductivity at about 33% wt. The specific electrical conductivity therefore decreases both at higher and lower KOH concentrations. Additionally, if the lye concentration is not balanced, the lye concentration on the cathode side can lead to crystallisation, as the crystallisation temperature rises steeply in case of KOH with increasing lye concentration.

However, the balancing of the lye concentrations also has drawbacks. In case of full mixing of the different lye cycles, dissolved gases, e.g. gases which were not separated from the alkaline electrolyte solution by the respective gas-liquid-separators, get introduced to the product gas streams. In particular, hydrogen gets introduced to the oxygen stream (hydrogen to oxygen, also "HTO") and oxygen gets introduced to the hydrogen stream (oxygen to hydrogen, also "OTH").

Furthermore, hydrogen and oxygen are susceptible to diffusion through the membrane (diaphragm) which separates the anode and cathode chamber of the electrolysis stack. Given the slower diffusion rates of oxygen through the hydroxyl ion permeable membrane (diaphragm) from the anode into the cathode half cell compared to the diffusion rates of hydrogen through the membrane from the cathode into the anode half cell, HTO crossover is in particular relevant. Therefore, a potential risk of operation of an electrolyser is that a lower explosion limit (LEL) for hydrogen in oxygen (HTO) in the anode section of the electrolyser might get exceeded.

According to P. Trinke et al (2018 *J. Electrochem. Soc.* 165 F502), the concentration of impurities, in particular HTO, are higher in case of full mixing of the lye cycles in comparison to a mode where the lye cycles are completely separated. Furthermore, the authors report that the hydrogen in oxygen concentration (HTO) significantly increases in full mix mode when the current density of the direct current supplied to the electrolyser stack decreases. This effect is further enhanced by high pressures. However, this poses a problem when an electrolyser is not operated under constantly high (hydrogen production) capacities, i.e. constantly high current densities supplied to the electrolyser stack. In particular at low turn-down capacities, e.g. when capacity utilization is low, the LEL might get exceeded when the electrolyser is operated with full mixing of the lye cycles. This is in particular relevant for those alkaline electrolysers, which use electrical power from renewable energy sources, for example wind power or solar power. For those power sources it cannot be ensured that the direct current required to operate the electrolyser is supplied with constant current density. However, the problem is not limited to fluctuating renewable energy supply, but also in terms of fluctuating power supply in cases of grid balancing, dynamic customer demand and the like. Furthermore, the problem always occurs in case the electrolyser needs to be shut down, for example to carry out maintenance.

So due to the fact that at low turn-down capacities the LEL for HTO might get exceeded when HTO is the highest, the minimum production capacity of the electrolyser is limited. In other words, the electrolyser can only be operated safely within a certain operating window. To allow for a larger operating range of the electrolyser, the hydrogen content in the oxygen product stream needs to be reduced, in particular at low production capacities, when also the current density of the direct current supplied to the electrolyser stack is low.

SUMMARY

It is therefore an object of the present invention to provide an electrolysis arrangement which at least in part overcomes the problems of the prior art.

In particular, an object of the present invention is to provide an electrolysis arrangement which enables to switch between mixed mode with full mixing of the lye cycles, separate mode with no mixing of the lye cycles, and also partly mixing of the lye cycles, dependent on the current density of the direct current supplied to the electrolyser.

It is therefore a further object of the present invention to provide an electrolysis arrangement which can be operated safely at changing high and low current densities of the direct current supplied to the electrolysis stack without exceeding a lower explosion limit threshold for HTO.

Therefore, a further object of the present invention is to provide an electrolysis arrangement which can be operated safely at changing high and low capacities without exceeding a lower explosion limit threshold for HTO.

A contribution to the at least partial solution of at least one of the above mentioned objects is provided by the subject-matter of the independent claims. The dependent claims provide preferred embodiments which contribute to the at least partial solution of at least one of the objects. Preferred embodiments of elements of a category according to the invention shall, if applicable, also be preferred for components of same or corresponding elements of a respective other category according to the invention.

The terms "having", "comprising" or "containing" etc. do not exclude the possibility that further elements, ingredients etc. may be comprised. The indefinite article "a" or "an" does not exclude that a plurality may be present.

In general, at least one of the underlying problems of the prior art is at least partially solved by an electrolysis arrangement comprising an electrolysis stack, wherein
the electrolysis stack is supplied with a direct current for the electrochemical production of hydrogen and oxygen from an alkaline electrolyte, the direct current having a current density, and
the electrolysis stack comprises an anode section and a cathode section,
an anode separator for the separation of oxygen from the electrolyte,
a cathode separator for the separation of hydrogen from the electrolyte,
an anode pipe system to circulate electrolyte between the anode section of the electrolysis stack and the anode separator,
a cathode pipe system to circulate electrolyte between the cathode section of the electrolysis stack and the cathode separator,
a first connecting pipe which interconnects the anode pipe system and the cathode pipe system, wherein a first control valve is arranged within the first connecting pipe,
a second control valve arranged within the anolyte pipe system or arranged within the catholyte pipe system,
a second connecting pipe which interconnects the anode pipe system and the cathode pipe system and which is arranged downstream to the first connecting pipe, the first control valve and the second control valve, wherein the second connecting pipe comprises a third control valve,
wherein the first connecting pipe, the second connecting pipe, the first control valve, the second control valve and the third control valve are arranged downstream to the anode separator and the cathode separator and upstream to the electrolysis stack, and
wherein the first control valve, the second control valve, the third control valve, the first connecting pipe and the second connecting pipe are configured so that dependent on an electrolyte flow rate passing the first control valve, the second control valve and the third control valve, an oxygen depleted electrolyte withdrawn from the anode separator and a hydrogen depleted electrolyte withdrawn from the cathode separator are supplied unmixed, partly mixed or fully mixed to the anode section of the electrolysis stack and the cathode section of the electrolysis stack.

In one embodiment, the electrolysis stack comprises a plurality of electrodes, in particular a plurality of anodes and cathodes. Accordingly, the electrolysis stack may comprise a plurality of anode chambers and cathode chambers, whereby the anode chambers and cathode chambers form the anode section and the cathode section of the electrolysis stack. The number of electrodes, i.e. anodes and cathodes, and anode and cathode chambers respectively, depends on the production capacity, i.e. the size of the electrolyser of the electrolysis arrangement and which type of electrolysis stack is used. The electrolysis stack is configured for the production of hydrogen and oxygen from an alkaline electrolysis medium. In one embodiment, the desired product of the electrolysis arrangement is hydrogen, and oxygen is a by-product, which is subject to further use or venting. In one embodiment, the electrolysis medium is aqueous potassium hydroxide (KOH) solution. In one embodiment, the concentration of the KOH is up to 6 mol/l (6 M). In the anode section of the electrolysis stack, oxygen is generated by oxidation of water-bound oxygen (oxidation number minus 2). In the cathode section of the electrolysis stack, hydrogen is generated by reduction of water-bound hydrogen (oxidation number plus 1).

The current density of the direct current is the amount of charge per unit time that flows through a unit area of a given cross section. In one embodiment, the unit area refers to the area of the respective electrode. The current density, for example, is given in $A/m^2$.

The term "separator" according to the invention refers to a gas/liquid separator to separate product gas of the electrolysis reaction from liquid electrolyte. In particular, an anode separator is configured to separate gaseous oxygen from liquid electrolyte and a cathode separator is configured to separate gaseous hydrogen from liquid electrolyte.

The oxygen generated in the anode section of the electrolysis stack is transported with the electrolyte via the anode pipe system to the anode separator. In the anode separator, the gaseous oxygen is separated from the liquid electrolyte. The oxygen depleted electrolyte, which still comprises dissolved oxygen, is further transported via the anode pipe system back to the anode section of the electrolysis stack, where it is subjected again to the electrolysis reaction. Hence, the electrolyte is circulated via the anode pipe system between the anode section of the electrolysis stack and the anode separator. The electrolyte circulating within the anode pipe system is also referred to as the anolyte of the electrolysis arrangement.

The hydrogen generated in the cathode section of the electrolysis stack is transported with the electrolyte via the cathode pipe system to the cathode separator. In the cathode separator, the gaseous hydrogen is separated from the liquid electrolyte. The hydrogen depleted electrolyte, which still comprises dissolved hydrogen, is further transported via the cathode pipe system back to the cathode section of the electrolysis stack, where it is subjected again to the electrolysis reaction. Hence, the electrolyte is circulated via the cathode pipe system between the cathode section of the electrolysis stack and the cathode separator. The electrolysis medium circulating in the cathode pipe system is also referred to as the catholyte of the electrolysis arrangement.

The electrolysis arrangement according to the invention allows to react to fluctuating direct current densities supplied to the electrolysis stack in such a way that the LEL for HTO is not exceeded even at low production capacities. This is solved according to the invention such that the first control valve, the second control valve, the third control valve, the first connecting pipe and the second connecting pipe of the electrolysis arrangement are arranged in a way that allows to switch between mixed mode, partly mixed mode and separate mode in terms of the electrolyte circulating in the anode pipe system and the cathode pipe system.

According to the mixed mode, the oxygen depleted electrolyte withdrawn from the anode separator and the hydrogen depleted electrolyte withdrawn from the cathode separator are supplied fully mixed to the anode section of the electrolysis stack and the cathode section of the electrolysis stack. According to this embodiment, the oxygen depleted electrolyte withdrawn from the anode separator and the hydrogen depleted electrolyte withdrawn from the cathode separator are first fully mixed and then the fully mixed electrolyte is split and separately fed to the anode section and the cathode section of the electrolysis stack. The mixed mode is preferably used at the maximum production capacity, or in general at high production capacities, i.e. high current densities, as the HTO and OTH crossover is low at high current densities. The mixed mode allows for fast balancing out the concentration differences between the anolyte and the catholyte.

According to the partly mixed mode, the oxygen depleted electrolyte withdrawn from the anode separator and the hydrogen depleted electrolyte withdrawn from the cathode separator are supplied partly mixed to the anode section of the electrolysis stack and the cathode section of the electrolysis stack. According to this embodiment, the oxygen depleted electrolyte withdrawn from the anode separator and the hydrogen depleted electrolyte withdrawn from the cathode separator are first partly mixed and then the partly mixed electrolyte, comprising mixed an unmixed electrolyte, is split and separately fed to the anode section and the cathode section of the electrolysis stack. The partly mixed mode is preferably used at high and medium production capacities, i.e. high and medium current densities. The HTO and OTH crossover is relatively low at medium current densities, but high enough so that full mixing is not sought. The partly mixed mode allows for relatively fast balancing out of concentration differences between the anolyte and the catholyte. For instance, it was found that mixing a fraction of 30 percent of the anolyte and catholyte, related to the volume flow of anolyte and catholyte withdrawn from the anode separator and cathode separator, is sufficient to balance out concentration differences between anolyte and catholyte within a reasonable time period.

According to the separate mode, the oxygen depleted electrolyte withdrawn from the anode separator and the hydrogen depleted electrolyte withdrawn from the cathode separator are not mixed at all, but separately fed to the anode section of the electrolysis stack and the cathode section of the electrolysis stack. According to this embodiment, the oxygen depleted electrolyte withdrawn from the anode separator and the hydrogen depleted electrolyte withdrawn from the cathode separator are not mixed at all, but from the outset separately fed to the anode section and the cathode section of the electrolysis stack. The separate mode is preferably used at low production capacities or at turndown capacities, i.e. low current densities, as the HTO and OTH crossover is high at low current densities. Thus by not mixing the anolyte and the catholyte at all, the enrichment of hydrogen in the anolyte and/or enrichment of oxygen in the catholyte is limited by this measure.

A first connecting pipe and a second connecting pipe interconnect the anode pipe system and the cathode pipe system. Without the connecting pipes, the anode pipe system and the cathode pipe system would be completely separate from each other, and no direct material exchange between the anode pipe system and the cathode pipe system, which each form their own circuits, would be possible. Hence, the connecting pipes provide a connection between the anode pipe system and the cathode pipe system and thus provide direct material exchange between the electrolyte circulating in the anode pipe system and the electrolyte circulating in the cathode pipe system, i.e. the anolyte and the catholyte. The first connecting pipe comprises the first control valve. The second connecting pipe comprises the third control valve.

Hence, according to one embodiment, dependent on an electrolyte flow rate passing the first control valve and/or dependent on a valve lift of the first control valve, a fraction of oxygen depleted electrolyte withdrawn from the anode separator is transferred from the anode pipe system to the cathode pipe system. According to one further embodiment, dependent on an electrolyte flow rate passing the first control valve and/or dependent on a valve lift of the first control valve, a fraction of hydrogen depleted electrolyte withdrawn from the cathode separator is transferred from the cathode pipe system to the anode pipe system. In one embodiment, whether a fraction of anolyte is transferred to the cathode pipe system or a fraction of catholyte is transferred to the anode pipe system depends on where the second control valve is arranged, i.e. either within the anode pipe system or the cathode pipe system.

According to one further embodiment, dependent on an electrolyte flow rate passing the second control valve and/or dependent on a valve lift of the third control valve, a fraction of oxygen depleted electrolyte withdrawn from the anode separator is transferred from the anode pipe system to the cathode pipe system. According to one further embodiment, dependent on an electrolyte flow rate passing the third control valve and/or dependent on a valve lift of the third control valve, a fraction of hydrogen depleted electrolyte withdrawn from the cathode separator is transferred from the cathode pipe system to the anode pipe system. In one embodiment, whether a fraction of anolyte is transferred to the cathode pipe system or a fraction of catholyte is transferred to the anode pipe system depends on where the second control valve is arranged, i.e. either within the anode pipe system or the cathode pipe system.

In one embodiment, the anode pipe system comprises a pump to circulate the electrolyte between the anode section of the electrolysis stack and the anode separator. In one further embodiment, the cathode pipe system comprises a pump to circulate the electrolyte between the cathode section of the electrolysis stack and the cathode separator.

In one embodiment, the electrolysis stack comprises a membrane or a plurality of membranes, also referred to as diaphragm(s), which enables transportation of hydroxyl ions ($OH^-$) between the anode chambers and the respective cathode chambers, i.e. between the anode section and the cathode section of the electrolysis stack and vice versa. In one embodiment, the electrolysis stack comprises a plurality of membranes or diaphragms for transportation of hydroxyl ions between the anode section and the cathode section of the electrolysis stack.

In one embodiment, the electrolysis arrangement comprises a water supply to balance the water amount in the system of the electrolysis arrangement, as water is continuously consumed due to the electrolysis reaction. In one embodiment, the water feed comprises a water storage tank and a pump to supply water to the anode pipe system and/or the cathode pipe system of the electrolysis arrangement.

In one embodiment, the fraction of oxygen depleted electrolyte withdrawn from the anode separator and hydrogen depleted electrolyte withdrawn from the cathode separator that are mixed and supplied to the anode section of the electrolysis stack and the cathode section of the electrolysis stack is from 0% to 100% of a total amount of the electrolyte, or from 0.1% to 100%, or from 1% to 100%, or from 10% to 90%, or from 10% to 50%, or from 20% to 40%.

In one embodiment, the second control valve arranged within the anode pipe system or arranged within the cathode pipe system is arranged downstream to the first connecting pipe.

In one further embodiment, the second control valve arranged within the anode pipe system or arranged within the cathode pipe system is arranged upstream to the second connecting pipe.

In one embodiment, the first control valve is fully closed, the second control valve is opened and the third control valve is opened, so that the oxygen depleted electrolyte withdrawn from the anode separator and the hydrogen depleted electrolyte withdrawn from the cathode separator are supplied partly mixed to the anode section of the electrolysis stack and the cathode section of the electrolysis stack. According to this embodiment, the electrolysis arrangement is operated in partly mixed mode, wherein a part of the electrolyte withdrawn from the anode separator and the cathode separator is mixed before it is supplied to the anode section and the cathode section of the electrolysis stack.

In one further embodiment, the first control valve is fully closed, the second control valve is opened and the third control valve is fully closed, so that the oxygen depleted electrolyte withdrawn from the anode separator and the hydrogen depleted electrolyte withdrawn from the cathode separator are supplied unmixed to the anode section of the electrolysis stack and the cathode section of the electrolysis stack. According to this embodiment, no material exchange between the anolyte pipe system and the catholyte pipe system is possible. Hence, the electrolysis arrangement is operated in separate mode or full separate mode, without any mixing of anolyte and catholyte.

In one embodiment, the first control valve is opened, and the second control valve is fully closed, so that the oxygen depleted electrolyte withdrawn from the anode separator and the hydrogen depleted electrolyte withdrawn from the cathode separator are supplied fully mixed to the anode section of the electrolysis stack and the cathode section of the electrolysis stack. According to this embodiment, the electrolysis arrangement is operated in mixed mode or full mixed mode, with full mixing of anolyte and catholyte.

In one embodiment, when the oxygen depleted electrolyte withdrawn from the anode separator and the hydrogen depleted electrolyte withdrawn from the cathode separator are supplied unmixed, partly mixed, or fully mixed to the anode section of the electrolysis stack and the cathode section of the electrolysis stack, the fraction of the mixed electrolyte is
  increased when the current density of the direct current supplied to the electrolysis stack is increased and
  decreased when the current density of the direct current supplied to the electrolysis stack is decreased.

When a current density of the direct current supplied to the electrolysis stack is decreased, the amount of the fraction of the mixed electrolyte, i.e. the electrolyte obtained from mixing of the anolyte withdrawn from the anode separator and the catholyte withdrawn from the cathode separator, is also decreased. In other words, in such a case the amount of the fraction of the mixed electrolyte is decreased and the amount of the fraction of the unmixed electrolyte is increased correspondingly.

In case a current density of the direct current supplied to the electrolysis stack is increased, the amount of the fraction of the mixed electrolyte, i.e. the electrolyte obtained from mixing of the anolyte withdrawn from the anode separator and the catholyte withdrawn from the cathode separator, is also increased. In other words, in such a case the amount of the fraction of the mixed electrolyte is increased and the amount of the fraction of the unmixed electrolyte is decreased correspondingly.

Thus, the HTO and OTH crossover can be controlled by means of adapting the amount of mixed electrolyte to the current density of the direct current supplied to the electrolysis stack.

At a lower reference capacity, i.e. at low current densities, the HTO crossover from the cathode section to the anode section of the electrolysis stack is high, so that mixing of the anolyte withdrawn from the anode separator and catholyte withdrawn from the cathode separator is not desired or less desired.

In one embodiment, the lower reference capacity is 50% or less compared to the upper capacity limit of the electrolysis arrangement, in particular 30% to 50% compared to the upper capacity limit of the electrolysis arrangement. In one embodiment, the lower reference capacity is 40% or less compared to the upper capacity limit of the electrolysis arrangement, in particular 30% to 40% compared to the upper capacity limit of the electrolysis arrangement. In one embodiment, the lower reference capacity is 30% or less compared to the upper capacity limit of the electrolysis arrangement, in particular 20% to 30% compared to the upper capacity limit of the electrolysis arrangement. In one embodiment, the lower reference capacity is 25% or less compared to the upper capacity limit of the electrolysis arrangement, in particular 10% to 25% compared to the upper capacity limit of the electrolysis arrangement. The lower reference capacity is also referred to as lower turndown capacity.

In case the fraction of the mixed electrolyte is 100%, the anolyte withdrawn from the anode separator and the catholyte withdrawn from the cathode separator are mixed in their entirety. In one embodiment, the fraction of the mixed electrolyte is 100% for the upper capacity limit of the electrolysis arrangement, also referred to as upper reference capacity. At the upper reference capacity, the HTO crossover from the cathode chamber to the anode chamber of the electrolysis stack is low, so that full mixing of the anolyte and unmixed catholyte is possible, which enables easy balancing of the lye concentrations without exceeding the LEL.

According to one embodiment, when no direct current is supplied to the electrolysis stack so that no hydrogen and no oxygen is produced, the first control valve is fully closed, the second control valve is opened and the third control valve is fully closed, so that interconnections between the anode pipe system and the cathode pipe system are closed, so that the oxygen depleted electrolyte withdrawn from the anode separator and the hydrogen depleted electrolyte withdrawn from the cathode separator are supplied unmixed to the anode section of the electrolysis stack and the cathode section of the electrolysis stack.

According to one further embodiment, when the electrolyser arrangement is operated at 0 (zero) to 20% of the upper capacity limit of the electrolyser arrangement, preferably at 0 (zero) to 10% of the upper capacity limit of the electrolyser arrangement, the first control valve is fully closed, the second control valve is opened and the third control valve is fully closed, so that interconnections between the anode pipe system and the cathode pipe system are closed, so that the oxygen depleted electrolyte withdrawn from the anode separator and the hydrogen depleted electrolyte withdrawn from the cathode separator are supplied unmixed to the anode section of the electrolysis stack and the cathode section of the electrolysis stack.

Crossover of hydrogen from the cathode side of the electrolyser and oxygen from the anode side of the electrolyser is thus minimized, in case the electrolyser arrangement is operated at 0 (zero) capacity (stand-by) or at low capacities of 0 (zero) to 20% or 0 (zero) to 10% of the upper capacity limit.

When no current at all is supplied to the electrolysis stack, the electrolysis arrangement can thus be set to a stand-by operating condition and at the same time it is ensured that the LEL for HTO is not exceeded. From this steady-state, the system can be quickly started up again when direct current is available again.

In one embodiment, the third control valve arranged within the second connecting pipe is configured to balance out concentration differences between the electrolyte circulating within the anode pipe system and the electrolyte circulating within the cathode pipe system.

In particular when the oxygen depleted electrolyte withdrawn from the anode separator and the hydrogen depleted electrolyte withdrawn from the cathode separator are supplied partly mixed with a small fraction of mixed electrolyte to the anode section of the electrolysis stack and the cathode section of the electrolysis stack, the lye concentration in the anolyte decreases and the lye concentration in the catholyte increases due to the nature of the half-cell reaction in alkaline electrolysis. To balance out those concentration differences, the third control valve is configured to balance out concentration differences between the electrolyte circulating within the anode pipe system and the electrolyte circulating within the cathode pipe system.

In one embodiment, the third control valve is therefore configured so that electrolyte is withdrawn from the anode pipe system and fed to the cathode pipe system, so that the concentration of the electrolyte circulating within the cathode pipe system is decreased.

In one embodiment, the electrolysis arrangement does not comprise a direct hydraulic link between the anode separator and the cathode separator. Due to the third control valve, a direct hydraulic link between the anode and cathode separator can be omitted, i.e. is not required anymore. By removing a direct hydraulic link between the gas separators, any hydrogen and oxygen mixing through diffusion processes between the separators is prevented. Furthermore, the bypass of gas from the anode separator to the cathode separator and vice versa can be prevented. This can be a serious safety issue, for instance in case the control of the liquid levels in the separators is temporarily lost during operation.

In one embodiment, the third control valve receives control signals from liquid level controllers inside the gas separators.

For instance, when the liquid height in the anode separator is higher than in the cathode separator due to the generation of water according to the anode half reaction, the amount of electrolyte fed to the anode section of the electrolysis stack should be smaller than the amount of electrolyte fed to the cathode section of the electrolysis stack. Hence, according to one embodiment, by means of the third control valve arranged within the second connecting pipe, a higher amount of electrolyte is fed to the cathode section of the electrolysis stack than to the anode section of the electrolysis stack. In this context, when reference is made to the term "amount", in one embodiment the flow rate expressed through the volume flow, mass flow or molar flow is meant.

In one embodiment, a fourth control valve is arranged within the anode pipe system and a fifth control valve is arranged within the cathode pipe system, and wherein the fourth control valve and the fifth control valve are arranged downstream to the second connecting pipe and upstream to the electrolysis stack.

A fourth and a fifth control valve may be arranged within the anode pipe system respectively cathode pipe system to improve the control of flow of anolyte and catholyte to the anode section respectively cathode section of the electrolysis stack.

Therefore, according to one embodiment, the fourth and the fifth control valve are configured to control the flowrate of electrolyte supplied to the anode section of the electrolysis stack and the cathode section of the electrolysis stack.

For instance, the fourth control valve and the fifth control valve can ensure that equal amounts of anolyte and catholyte are fed to the anode section and the cathode section of the electrolysis stack, regardless of whether the electrolysis arrangement is operated in mixed mode, partly mixed mode or separate mode.

Therefore, according to one embodiment, the fourth and the fifth control valve are configured so that the flowrate of electrolyte supplied to the anode section of the electrolysis stack and the flowrate of electrolyte supplied to the cathode section of the electrolysis stack is essentially the same or is the same.

In one embodiment, the fourth and/or the fifth control valve are connected to a flow measurement device, such as a flowmeter.

BRIEF DESCRIPTION OF THE DRAWINGS

The invention will now be detailed by way of exemplary embodiments and examples with reference to the attached drawings. Unless otherwise stated, the drawings are not to scale. In the figures and the accompanying description, equivalent elements are each provided with the same reference marks.

DETAILED DESCRIPTION OF PREFERRED EMBODIMENTS

Figure 1:
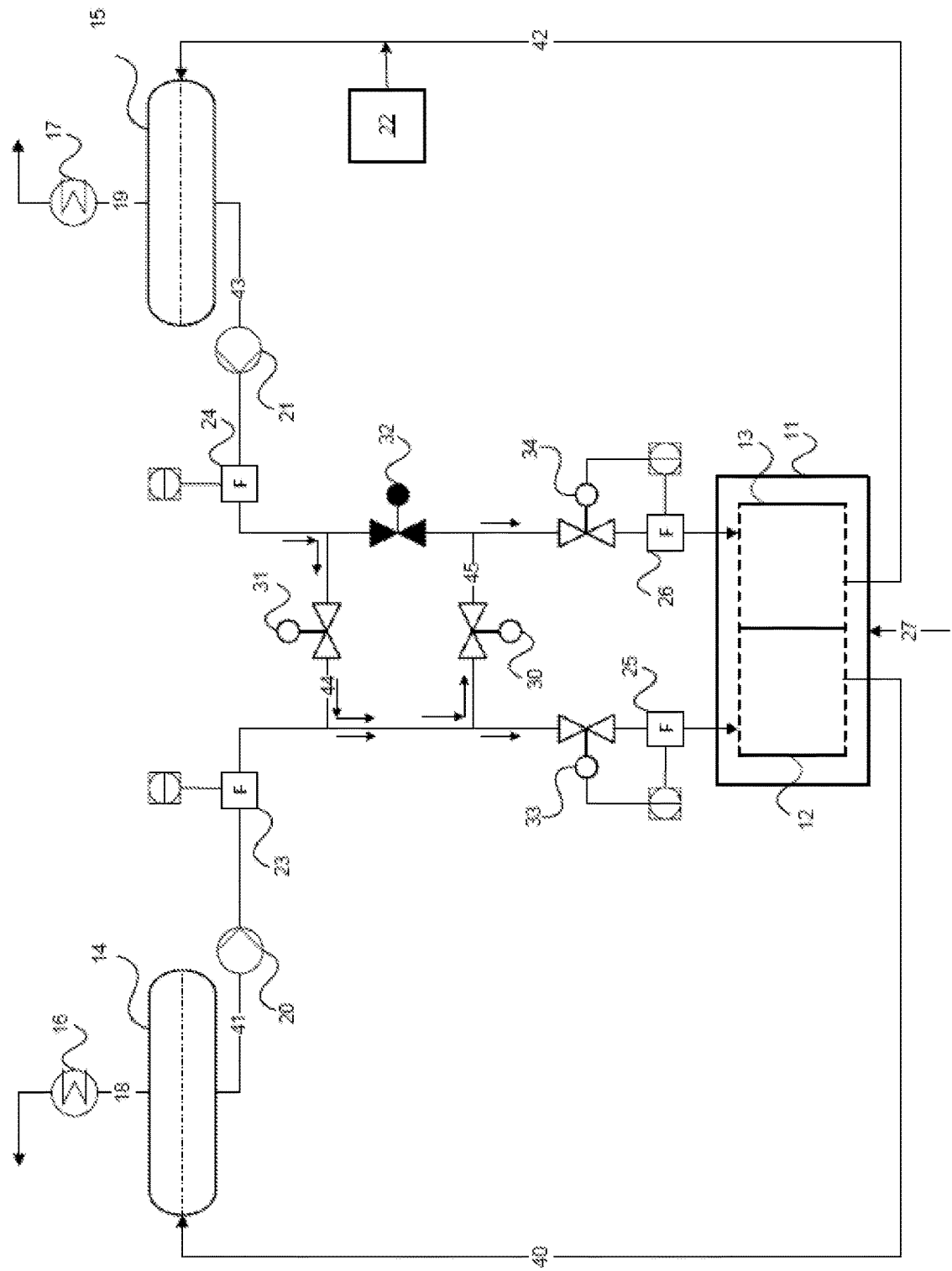
FIG. 1 depicts an electrolysis arrangement according to one embodiment of the invention wherein the electrolysis arrangement is operated in mixed mode.

FIG. 1 depicts a simplified flow scheme of an electrolysis arrangement according to one embodiment of the invention, wherein the electrolysis arrangement is operated in mixed mode.

The electrolysis arrangement comprises an electrolysis stack 11 to which direct current 27 with a certain current density is supplied for the water splitting electrolysis reaction within the electrolysis stack 11. The current density can fluctuate, for example if the electricity is generated from a renewable energy source, such as wind power.

The electrolysis stack 11 comprises a plurality of anodes and cathodes, as well as a corresponding plurality of anode and cathode chambers. The plurality of anode and cathode chambers forms the anode section 12 and the cathode section 13 of the electrolysis stack 11. Within the anode section 12, oxygen is generated by oxidation of water-bound oxygen at the anodes of the electrolysis stack 11. Within the cathode section 13, hydrogen is generated by reduction of water-bound hydrogen at the cathodes of the electrolysis stack 11. Anodes and cathodes are physically separated by diaphragms, which enable the exchange of hydroxyl ions between the anode and the cathode section of the electrolysis stack. To some extent, also diffusion of oxygen and hydrogen through the diaphragm is possible. Crossover of oxygen to the cathode section is referred to as oxygen to hydrogen (OTH) and crossover of hydrogen to the anode section is referred to as hydrogen to oxygen (HTO). As the diffusion coefficient of hydrogen is significantly higher than the diffusion coefficient of oxygen, mostly HTO occurs. This may result in an increasing hydrogen concentration in the cathode section 13 and further cathode related parts of the electrolysis arrangement and finally may result in an exceedance of the lower explosion limit (LEL) for hydrogen to oxygen (HTO). As mentioned above, the HTO crossover in particular occurs at low current densities of the direct current 27 supplied to the electrolysis stack 11.

The electrolysis arrangement as depicted in FIG. 1 further comprises an anode pipe system, which at least comprises the pipes 40 and 41. Within the anode pipe system, an anode separator 14 is arranged. Within the anode separator 14, gaseous oxygen is physically separated from the liquid electrolyte circulating within the anode pipe system. The alkaline electrolyte used in the entire electrolysis system is for example highly concentrated aqueous potassium hydroxide (KOH) solution. The electrolyte circulating within the anode pipe system is also referred to as the anolyte. The oxygen loaded anolyte is withdrawn from the anode section 12 of the electrolysis stack 11 via pipe 40, introduced into the anode separator 14 and after separation of oxygen, the oxygen depleted anolyte is withdrawn from anode separator 14 and sent to the anode section 12 of the electrolysis stack 11 to again generate oxygen by electrolysis within the electrolysis stack 11. Circulation of the anolyte within the anolyte pipe system is effected by pump 20. Downstream to pump 20, a flowmeter 23 is arranged. The signal taken from the flowmeter 23 can be used as a control variable to control the flow rate of the pump 20. The anode separator 14 is further equipped with a liquid level controller (not shown), which controls the liquid level of the anolyte within the anode separator 14. The gaseous oxygen product separated within anode separator 14 is cooled via heat exchanger 16, which is supplied with cooling water (not shown). Thereby water vapour contained in the oxygen product stream is condensed and returned to the anode separator and finally the anode pipe system. The dried oxygen product stream is withdrawn from the heat exchanger 16 via pipe 18. It is then subjected to a further processing step, e.g. a purification step.

The electrolysis arrangement as depicted in FIG. 1 further comprises a cathode pipe system, which at least comprises the pipes 42 and 43. Within the cathode pipe system, a cathode separator 15 is arranged. Within the cathode separator 15, gaseous hydrogen is physically separated from the liquid electrolyte circulating within the cathode pipe system. The electrolyte circulating within the cathode pipe system is also referred to as the catholyte. The hydrogen loaded catholyte is withdrawn from the cathode section 13 of electrolysis stack 11 via pipe 42, introduced into the cathode separator 15 and after separation of gaseous hydrogen from the liquid catholyte, the hydrogen depleted catholyte is withdrawn from cathode separator 15 and sent to the cathode section 13 of the electrolysis stack 11 to again generate hydrogen by electrolysis within the electrolysis stack 11. Circulation of the catholyte within the catholyte pipe system is effected by pump 21. Downstream to pump 21, a flowmeter 24 is arranged. The signal taken from the flowmeter 24 can be used as a control variable to control the flow rate of the pump 21. The cathode separator 15 is further equipped with a liquid level controller (not shown), which controls the liquid level of the catholyte within the cathode separator 15. The gaseous hydrogen product separated within cathode separator 15 is cooled via heat exchanger 17, which is supplied with cooling water (not shown). Thereby water vapour contained in the hydrogen product stream is condensed and returned to the cathode separator 15 and finally the cathode pipe system. The dried hydrogen product stream is withdrawn from the heat exchanger 17 via pipe 19. It is then subjected to a further processing step, e.g. a purification step.

As water is continuously consumed by the electrolysis reaction, a water supply 22 is provided, so that water can be fed to the cathode pipe system. The amount of water added per unit of time by water supply 22 corresponds to the amount of water consumed per unit of time by the production of hydrogen and oxygen of the electrolysis arrangement.

Due to the anode and cathode related electrochemical half reactions in alkaline water electrolysis, per mol of produced hydrogen one mol of water is generated within the anode section 12 and two mol of water are consumed within the cathode section 13 of the electrolysis stack 11.

Hence, the KOH concentrations within the separated pipe systems of the electrolysis arrangement will get unbalanced as the electrolysis reaction proceeds. In particular, the KOH concentration within the anode pipe system (pipes 40, 41), the anode separator 14 and the anode section 12 decreases (water generation, thus dilution), and the KOH concentration within the cathode pipe system (pipes 42, 43), the cathode separator 15 and the cathode section 13 increases (water consumption, increase of concentration).

Thus, the water amount increases in the anode related section of the electrolysis arrangement, and the water amount decreases in the cathode related section of the electrolysis arrangement. Hence, also the liquid levels between the anode separator 14 and the cathode separator 15 get unbalanced.

Figure 3:
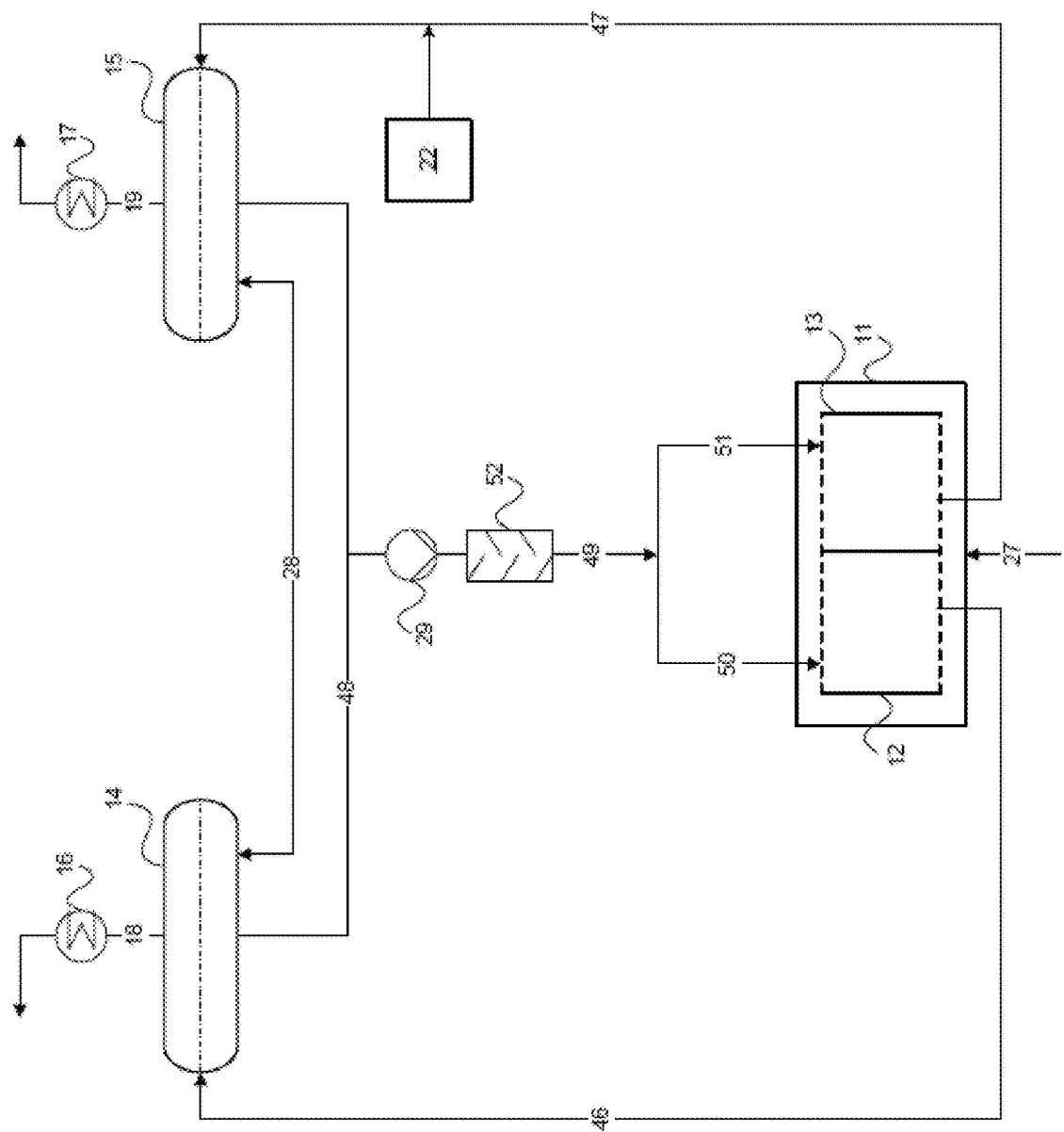
FIG. 3 depicts an electrolysis arrangement according to the prior art.

To balance the KOH concentration between the anode pipe system and the cathode pipe system, the anolyte and catholyte can be mixed in their entirety as known from the prior art and depicted in FIG. 3. According to the prior art solution, the anolyte withdrawn from anode separator 14 and the catholyte withdrawn from cathode separator 15 via pipe 48 and pumped by pump 29 are subsequently merged in pipe 49 and then fully mixed by static mixer 52. Downstream to the static mixer 52, the mixed electrolyte is split and separately fed to the anode section 12 and the cathode section 13 of the electrolysis stack 11. However, as aforementioned, in particular at low current densities of the direct current 27 supplied to electrolysis stack 11, or in case that no current at all is supplied to the electrolysis stack 11, also HTO crossover is high. This ultimately results, due to the full mixing of anolyte and catholyte in static mixer 52, in high hydrogen concentrations within the anode related parts (anode section 12, pipe 46, anode separator 14, parts of pipe 48). This may result in the problem that a lower explosion limit (LEL) for anode related parts of the electrolysis arrangement is exceeded.

It is therefore desirable that the electrolysis arrangement can not only be operated in a full mixed mode, but also in a separate mode (unmixed mode) without mixing the anolyte and catholyte or in a partly mixed mode with partly mixing of the anolyte and the catholyte.

Figure 2:
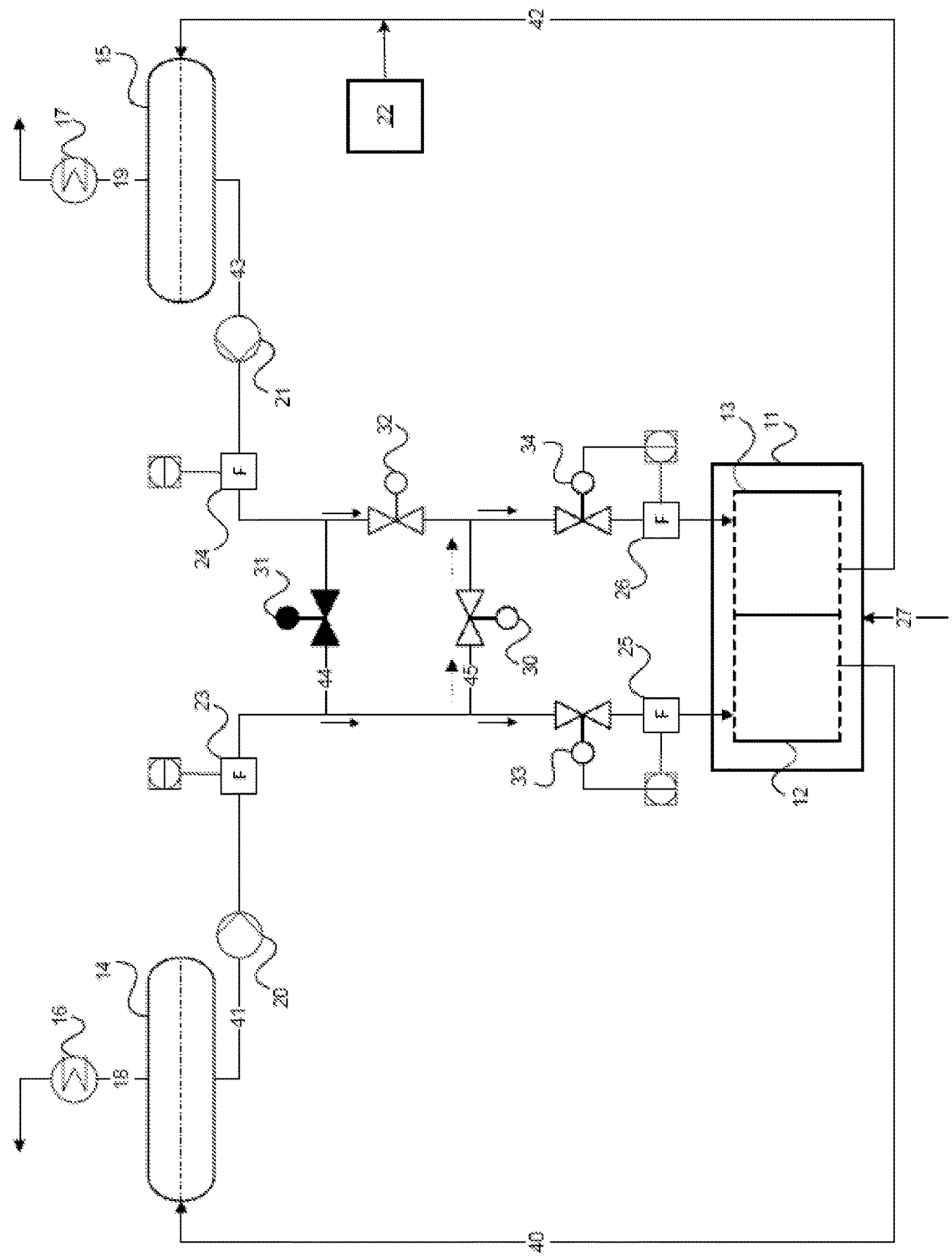
FIG. 2 depicts an electrolysis arrangement according to one embodiment of the invention wherein the electrolysis arrangement is operated in partly mixed mode.

This is, according to one embodiment, solved by the invention as illustrated in FIG. 1 and FIG. 2.

The electrolysis arrangement of FIG. 1 represents the electrolysis arrangement when it is operated in mixed mode, wherein oxygen depleted electrolyte withdrawn from anode separator 14 and hydrogen depleted electrolyte withdrawn from cathode separator 15 is fully mixed before it is supplied to the electrolysis stack. The electrolysis arrangement therefore comprises a first connecting pipe 44, which interconnects the pipes 41 of the anolyte pipe system and pipe 43 of the catholyte pipe system. First connecting pipe 44 comprises a first control valve 31. A further, second control valve 32 is arranged within pipe 43 of the cathode pipe system. Second control valve 32 is closed, indicated by the black filling. Therefore, hydrogen depleted catholyte withdrawn from cathode separator 15 is routed via pipe 44 and the opened first control valve 31 to pipe 41, where it is merged with the oxygen depleted anolyte withdrawn from the anode separator in pipe 41. The routing of the anolyte and catholyte stream is indicated by the small arrows marked next to the pipes. The anolyte and catholyte is therefore mixed in pipe 41 downstream to the connecting line 44. Mixing can be further enhanced by arranging a static mixer or any other mixing device within pipe 41 downstream to the first connecting pipe 44 (not shown). One part of the electrolyte is then further routed to the anode section 12 of the electrolysis stack 11 via pipe 41. A second part of the electrolyte is further routed to pipe 43 via a second connecting pipe 45. The second connecting pipe 45 comprises a third control valve 30, which is opened in the case of the operating mode, i.e. mixed mode, of the electrolysis arrangement according to the FIG. 1. The amount (volume flow or mass flow) of electrolyte each routed to the anode section 12 and the cathode section 13 is controlled by a fourth control valve 33 arranged within pipe 41 and a fifth control valve 34 arranged within pipe 43. Downstream to the fourth control valve 33 and the fifth control valve 34 respectively, flowmeters 25 and 26 are arranged. Signals of the flowmeters 25 and 26 can be used to control the valve lift of control valves 33 and 34, i.e. the flow rate of the electrolyte supplied to the anode section 12 and the cathode section 13 respectively.

FIG. 2 represents the same electrolysis arrangement as depicted in FIG. 1, but with the electrolysis arrangement operating in partly mixed mode, wherein oxygen depleted electrolyte withdrawn from anode separator 14 and hydrogen depleted electrolyte withdrawn from cathode separator 15 are only partly mixed before they are supplied to the electrolysis stack. In other words, they are partly mixed to the anode section 12 of the electrolysis stack 11 and the cathode section 13 of the electrolysis stack 11. Here, the first control valve is closed (indicated again by black filling). Therefore, anolyte withdrawn from anode separator 14 can only be routed via pipe 41 to the anode section 12 of the electrolysis stack 11. Catholyte withdrawn from cathode separator 15 can only be routed via pipe 43 to the cathode section 13 of the electrolysis stack 11. No mixing of oxygen depleted anolyte withdrawn from anode separator 14 and hydrogen depleted catholyte withdrawn from cathode separator 15 occurs so far. The flow rate of anolyte and catholyte routed to the electrolysis stack 11 is again controlled by third control valve 33 and fourth control valve 34, respectively. However, during this mode of operation, the anolyte is slightly diluted due to generation of water in the anode section 12 of the electrolysis stack 11. On the other hand, the catholyte slightly increases in lye concentration over time due to consumption of water in the cathode section 13 of the electrolysis stack 11. Therefore, a small amount of anolyte is routed from pipe 41 via second connecting pipe 45 by means of the third control valve 45 to pipe 43 (indicated by the dotted arrows), to balance out the lye concentrations and electrolyte amounts between anolyte within pipe 41 and catholyte within pipe 43. Due to the lye concentration and lye amount balancing function of third control valve 45, no direct hydraulic link between the anode separator 14 and the cathode separator is required. Such a direct hydraulic link 28 is shown in the state of the art electrolysis arrangement according to FIG. 3. Hydraulic link 28 may comprise a valve and a pump to either route anolyte from the anode separator 14 to the cathode separator 15 or vice versa. It is understood by a person skilled in the art that the aforementioned mode of operation according to FIG. 2 means that only a small amount of anolyte and catholyte is mixed, before it is supplied to the anode and cathode section of the electrolysis stack. However, the flowrate passing the third control valve 45 may also be increased so that the mode of operation comes closer to operation in full mix mode.

The electrolysis arrangement as depicted in FIGS. 1 and 2 may also be operated in separate mode or full separate mode. This mode is realized when the first control valve 31 and the third control valve 45 are fully closed, and the second control valve 32 is opened. FIG. 1 and FIG. 2 and the accompanying description only show examples of operating conditions, but in principle the electrolysis arrangement according to the invention can be operated, depending on the flow rate of electrolyte passing the control valves 30, 31 and 32, in the entire operating range from full separate mode to full mixed mode.

The partly mixed mode is in particular useful to adapt the mixing rate of the electrolyte to fluctuating current densities. For example, in case a current density of the direct current 27 supplied to the electrolysis stack 11 is decreased (e.g. at turndown capacities of the electrolysis arrangement), HTO crossover in the system will increase. To decrease this HTO crossover again, the amount of mixed electrolyte supplied to the electrolysis stack can be decreased. This can be done, for example, by decreasing the electrolyte flow rate passing the third control valve 30. In case a current density of the direct current 27 supplied to the electrolysis stack 11 is increased (e.g. to operate the electrolysis arrangement close to full capacity), HTO crossover in the system will decrease. To facilitate the balancing between anolyte and catholyte concentrations, the amount of mixed electrolyte supplied to the electrolysis stack can thus be increased. This can be done by increasing the electrolyte flow rate passing the third control valve 30.

LIST OF REFERENCE SIGNS 11 electrolysis stack
12 anode section of electrolysis stack 13 cathode section of electrolysis stack
14 anode separator
15 cathode separator
16 oxygen stream cooler
17 hydrogen stream cooler
18 oxygen stream
19 hydrogen stream
20 anolyte pump
21 catholyte pump
22 water supply
23-26 flow meter
27 direct current supply
28 direct hydraulic link
29 electrolyte pump
30 third control valve
31 first control valve
32 second control valve
33 fourth control valve
34 fifth control valve
40, 41 pipe (anode pipe system)
42, 43 pipe (cathode pipe system)
44 first connecting pipe
45 second connecting pipe
46-51 pipe
52 static mixer It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An electrolysis arrangement, comprising;
an electrolysis stack, wherein
the electrolysis stack is supplied with a direct current for the electrochemical production of hydrogen and oxygen from an alkaline electrolyte, the direct current having a current density, and
the electrolysis stack comprises an anode section and a cathode section,
an anode separator for the separation of oxygen from the electrolyte,
a cathode separator for the separation of hydrogen from the electrolyte,
an anode pipe system to circulate electrolyte between the anode section of the electrolysis stack and the anode separator,
a cathode pipe system to circulate electrolyte between the cathode section of the electrolysis stack and the cathode separator,
a first connecting pipe which interconnects the anode pipe system and the cathode pipe system, wherein a first control valve is arranged within the first connecting pipe,
a second control valve arranged within an anolyte pipe system or arranged within a catholyte pipe system,
a second connecting pipe which interconnects the anode pipe system and the cathode pipe system and which is arranged downstream to the first connecting pipe, the first control valve and the second control valve, wherein the second connecting pipe comprises a third control valve,
wherein the first connecting pipe, the second connecting pipe, the first control valve, the second control valve and the third control valve are arranged downstream to the anode separator and the cathode separator and upstream to the electrolysis stack, and
wherein the first control valve, the second control valve, the third control valve, the first connecting pipe and the second connecting pipe are configured so that dependent on an electrolyte flow rate passing the first control valve, the second control valve and the third control valve, an oxygen depleted electrolyte withdrawn from the anode separator and a hydrogen depleted electrolyte withdrawn from the cathode separator are supplied unmixed, partly mixed or fully mixed to the anode section of the electrolysis stack and the cathode section of the electrolysis stack.

2. The electrolysis arrangement according to claim 1, wherein the second control valve arranged within the anode pipe system or arranged within the cathode pipe system is arranged downstream to the first connecting pipe.

3. The electrolysis arrangement according to claim 1, wherein the first control valve is fully closed, the second control valve is opened and the third control valve is opened, so that the oxygen depleted electrolyte withdrawn from the anode separator and the hydrogen depleted electrolyte withdrawn from the cathode separator are supplied partly mixed to the anode section of the electrolysis stack and the cathode section of the electrolysis stack.

4. The electrolysis arrangement according to claim 1, wherein the first control valve is fully closed, the second control valve is opened and the third control valve is fully closed, so that the oxygen depleted electrolyte withdrawn from the anode separator and the hydrogen depleted electrolyte withdrawn from the cathode separator are supplied unmixed to the anode section of the electrolysis stack and the cathode section of the electrolysis stack.

5. The electrolysis arrangement according to claim 1, wherein the first control valve is opened, the second control valve is fully closed and the third control valve is opened, so that the oxygen depleted electrolyte withdrawn from the anode separator and the hydrogen depleted electrolyte withdrawn from the cathode separator are supplied fully mixed to the anode section of the electrolysis stack and the cathode section of the electrolysis stack.

6. The electrolysis arrangement according to claim 1, wherein when the oxygen depleted electrolyte withdrawn from the anode separator and the hydrogen depleted electrolyte withdrawn from the cathode separator are supplied unmixed, partly mixed or fully mixed to the anode section of the electrolysis stack and the cathode section of the electrolysis stack, the fraction of the mixed electrolyte is
increased when the current density of the direct current supplied to the electrolysis stack is increased and
decreased when the current density of the direct current supplied to the electrolysis stack is decreased.

7. The electrolysis arrangement according to claim 1, wherein when no direct current is supplied to the electrolysis stack so that no hydrogen and no oxygen is produced, the first control valve is fully closed, the second control valve is opened and the third control valve is fully closed, so that interconnections between the anode pipe system and the cathode pipe system are closed, so that the oxygen depleted electrolyte withdrawn from the anode separator and the hydrogen depleted electrolyte withdrawn from the cathode separator are supplied unmixed to the anode section of the electrolysis stack and the cathode section of the electrolysis stack.

8. The electrolysis arrangement according to claim 1, wherein the third control valve arranged within the second connecting pipe is configured to balance out concentration differences between the electrolyte circulating within the anode pipe system and the electrolyte circulating within the cathode pipe system.

9. The electrolysis arrangement according to claim 8, wherein the third control valve is configured so that electrolyte is withdrawn from the anode pipe system and fed to the cathode pipe system, so that the concentration of the electrolyte circulating within the cathode pipe system is decreased.

10. The electrolysis arrangement according to claim 1, wherein the electrolysis arrangement does not comprise a direct hydraulic link between the anode separator and the cathode separator.

11. The electrolysis arrangement according to claim 1, wherein a fourth control valve is arranged within the anode pipe system and a fifth control valve is arranged within the cathode pipe system, and wherein the fourth control valve and the fifth control valve are arranged downstream to the second connecting pipe and upstream to the electrolysis stack.

12. The electrolysis arrangement according to claim 11, wherein the fourth and the fifth control valve are configured to control the flowrate of electrolyte supplied to the anode section of the electrolysis stack and the cathode section of the electrolysis stack.

13. The electrolysis arrangement according to claim 12, wherein the fourth and the fifth control valve are configured so that the flowrate of electrolyte supplied to the anode section of the electrolysis stack and the flowrate of electrolyte supplied to the cathode section of the electrolysis stack is essentially the same or is the same.

* * * * *